United States Patent [19]
Moriarty

[11] 3,893,241
[45] July 8, 1975

[54] ORTHODONTIC HOOK DEVICE
[76] Inventor: Thomas M. Moriarty, 2507 S. 105th Ave., Omaha, Nebr. 68124
[22] Filed: Jan. 28, 1974
[21] Appl. No.: 436,904

[52] U.S. Cl................................. 32/14 A; 32/14 A
[51] Int. Cl............................................. A61c 7/00
[58] Field of Search...... 32/14 A, 14 B, 14 C, 14 D, 32/14 E, 14 F

[56] References Cited
UNITED STATES PATENTS
3,683,502  8/1972  Wallshein .......................... 32/14 A Primary Examiner—Robert Peshock
Attorney, Agent, or Firm—Henderson and Strom

[57] ABSTRACT

An orthodontic hook device formed of either stainless steel wire or stainless steel plate and designed to provide two separate areas for welding to a main arch wire. The hook device is of a one piece ovoid design having a removably attached handle and attaches to the main arch wire at approximately the vertical mid section of the device, with one half thereof forming a closed loop section and the other one half thereof forming an open loop section. The open loop section is used to engage orthodontic elastics while the closed loop section is used to engage orthodontic springs and/or elastics.

8 Claims, 7 Drawing Figures

3,893,241

ORTHODONTIC HOOK DEVICE

BACKGROUND OF THE INVENTION

This invention relates to a weldable multiple use orthodontic hook device for the engagement of orthodontic elastics and coil springs during various phases of orthodontic treatment. The hook device finds its primary utility as an attachment point for intermaxillary and inter-arch elastics which attach between areas in the maxillary and/or mandibular arches or between the maxillary and mandibular arches. The elastics and springs are commonly used to close spacing between teeth, retract anterior teeth and shift relationships between the upper and lower arches.

At the present time orthodontists hand fabricate a hook from stainless steel or brass wire which is silver soldered to the arch wire at a single attachment point, use a manufactured hook secured to a tube that is slipped over the arch wire and then crimped or soldered in place, and/or use soft steel wire which is tied to the orthodontic brackets.

Hand fabricated hooks require considerable time to make and the heat from soldering weakens both the hook and the arch wire. The manufactured hook - tube device cannot be used in all cases because the arch wire may have an abrupt bend formed therein over which the tube will not slide or the hook - tube device must be positioned before the arch wire is bent. Soft wire is also not satisfactory because it readily deforms and considerable adjustment must be made to the springs hooked thereto to obtain continuous and constant pressure.

The disadvantages of the three commonly used hook devices thus relate to the problems inherent in all soldering, the utilization of only one attachment point, the difficulty of either making the device or the difficulty of positioning the device on the arch wire, the utilization of valuable time to make and attach the device and time to resecure the device in the event the solder or crimp joint fails. These disadvantages also cause the patient discomfort and repeated return trips to the orthodontist for repairs and adjustments to the orthodontic devices.

SUMMARY OF THE INVENTION

Briefly stated, the improved weldable orthodontic hook device of this invention is formed of stainless steel wire or plate providing a two point weld attachment to orthodontic arch wires, and forms an open loop and a closed loop after being welded to an orthodontic arch wire. The two point weld feature of this improved hook device provides for a shear resistant electro weld attachment, thus negating the need for silver soldering. The design of this hook also provides for a breakaway extension to be used for positioning the hook to the arch wire during welding.

In a presently preferred form of the invention, the hook is formed from stainless steel wire or plate having a general ovoid shape for welding to orthodontic arch wires through the short axis thereof and at approximately the mid section of the long axis. One half of the hook then provides an open loop form for attachment of elastic devices while the closed loop form may be used to secure wire coil springs and/or elastics.

By employing capicator electric welding heat levels, the resiliency of the stainless steel main arch wire is maintained. Since both the stainless steel hook and arch wire maintain their original resiliency during the welding attachment of the hook to the arch wire the area of attachment to the arch wire and the hook itself maintain sufficient stiffness to resist possible deforming actions such as chewing and toothbrushing while also maintaining proper resiliency and form for continued orthodontic treatment.

It is therefore an object of this invention to provide an improved and novel orthodontic appliance in the form of a hook device for attachment to arch wires.

Another object is the provision of a hook device for an orthodontic appliance employing a closed loop section and an open loop section wherein the open loop section is commonly used for repeated attachment of elastic loops by the patient himself between office visits and the closed loop section provides an area of attachment of a coiled spring by the orthodontist or as a secondary loop for the patient to attach elastics in another direction or to a second point different to the first point of elastic direction.

Yet another object of this invention is the provision of a hook device for orthodontic appliances having a breakaway extension integrally connected to the device to assist the orthodontist in aligning the hook to the arch wire at the time of welding, and which extension can readily be removed by shearing or cutting at a preformed shear point.

A further object of this invention is to provide a hook device which can be welded to an arch wire of an orthodontic appliance and which is economical of manufacture, extremely effective in use, readily attachable to an orthodontic arch wire, and simple and durable in construction.

These objects and other features and advantages of this invention will become readily apparent upon reference to the following description when taken in conjunction with the accompanying drawings.

In the drawings as hereinafter described, two embodiments of the invention are illustrated, however various modifications can be made thereto without departing from the true spirit and scope of the invention.

DESCRIPTION OF THE PREFERRED EMBODIMENT

Figure 1:
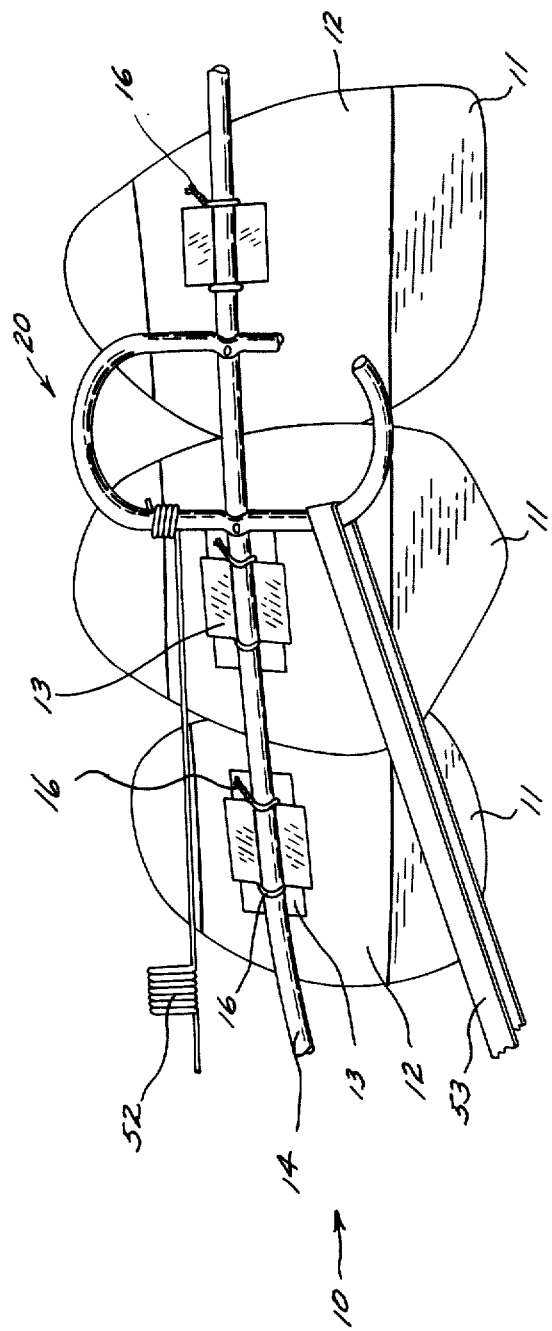
FIG. 1 is a perspective view of the preferred embodiment of the orthodontic hook device of this invention as shown secured to an arch wire and engaged with an elastic band and a coil spring.

Referring now to the drawings and in particular to FIG. 1, a dental arch 10 is formed by a plurality of adjacent teeth 11 of a patient undergoing orthodontic treatment. Secured, as by cementing, to each tooth is a tooth band 12, and secured to each band 12 is an orthodontic bracket 13. An orthodontic arch wire 14 extends around the dental arch 10 of the patient and is secured to each bracket 13 by standard tie wires 16.

Figure 2:
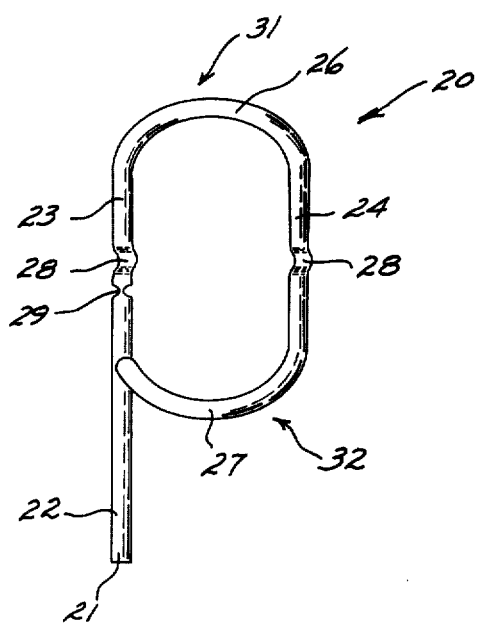
FIG. 2 is a rear elevational view of the hook device of FIG. 1.
Figure 3:
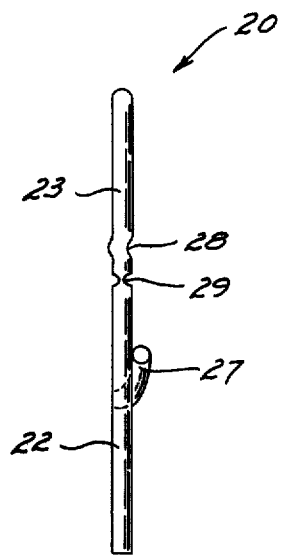
FIG. 3 is an end elevational view thereof.

The orthodontic hook device of this invention, indicated generally at 20 in FIGS. 1, 2 and 3, is formed from a round stainless steel wire having a diameter of between 0.012 and 0.022 to match the diameter of the arch wire 14. The hook device 20 in general is formed from an elongated strip of wire 21 into a generally ovoid shape having a handle 22 extending therefrom. In particular the device 20 has a pair of parallel legs 23 and 24 and a pair of arcuate links 26 and 27 wherein one of the parallel legs 23 is approximately one and one-half times longer than the other leg 24. One of the links 26 interconnects the upper ends of the legs and the other link 27 is connected on one end to the other leg 24 lower end and the other end thereof is in juxtaposition with and behind the one leg 23 intermediate the ends thereof with the lower portion of the one leg 23 forming the handle 22. At approximately the midpoint of each leg between the links, the legs have a slight bend 28 formed therein thus forming an indentation 28 on the rear side thereof. The indentations 28 divide the device 20 into a top portion or closed loop 31 and a bottom portion or open loop 32. The one leg 23 also has a notch 29 formed therein just below the indentation 28 with the portion of the leg 23 disposed just below the notch 29 forming the top end of the handle 22.

Figure 4:
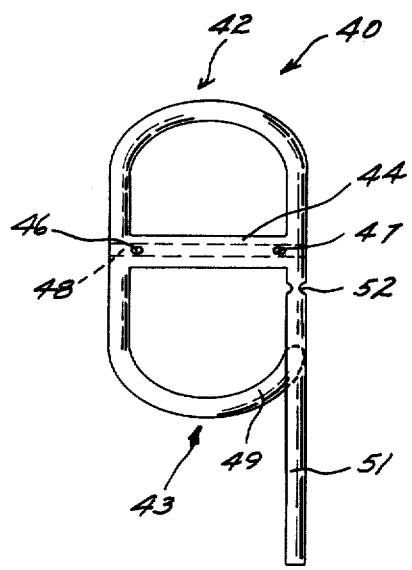
FIG. 4 is a front elevational view of a modified embodiment of the orthodontic hook device of this invention.
Figure 5:
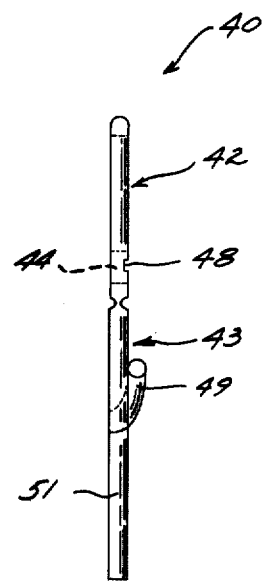
FIG. 5 is an end elevational view of the hook device shown in FIG. 4.

A modified embodiment of the invention is shown in FIG. 4 and FIG. 5 wherein a stainless steel plate metal of about 0.025 inch thickness is used in the fabrication of the orthodontic hook device 40. The hook device 40 is of a similar design to the hook device 20 in that it is also of a general ovoid design having a closed loop 42 and an open loop 43 of approximate equal proportions. The closed loop 42 has a transverse base 44 which front surface thereof contains two small welding locator indentations 46 and 47. The rear surface of the base 44 contains a horizontal groove 48 which is designed to receive the arch wire 14. The horizontal groove 48 has a width equal to the diameter of the arch wire and to a depth equal to approximately one-half of the arch wire diameter. The welding locator indentations 46 and 47 are located on the opposite surface of the base 44 to the horizontal groove 48 and are positioned proximate the right and left ends of the base 44. The free end 49 of the open loop 43 is positioned so as to lie behind but not in contact with a handle 51 which is located below and near the welding locator indentation 47. Located between the base 44 and the handle 51 is a circumferential notch 52 to facilitate the removal of the handle 51 following the securement of the base 44 to the arch wire.

Figure 6:
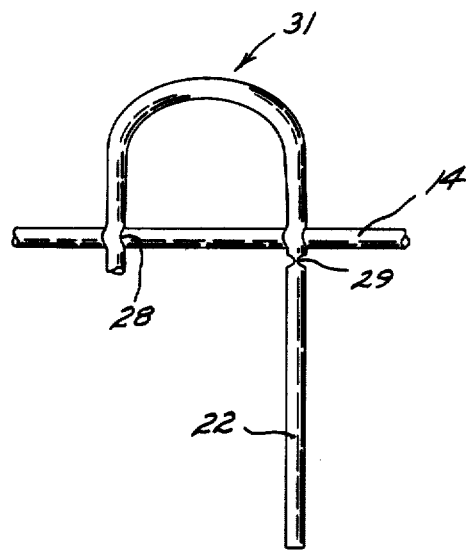
FIG. 6 is a front elevational view of an alternate form of the orthodontic hook device of FIG. 2 wherein the open loop is removed.

In the event only a closed loop 31 or 42 is required the open loop 32 or 43 can be removed by cutting, as shown in FIG. 6.

Both hook devices 20 and 40, as depicted in the drawings, are to be considered as right side versions while left side versions would be mirror images thereof.

Figure 7:
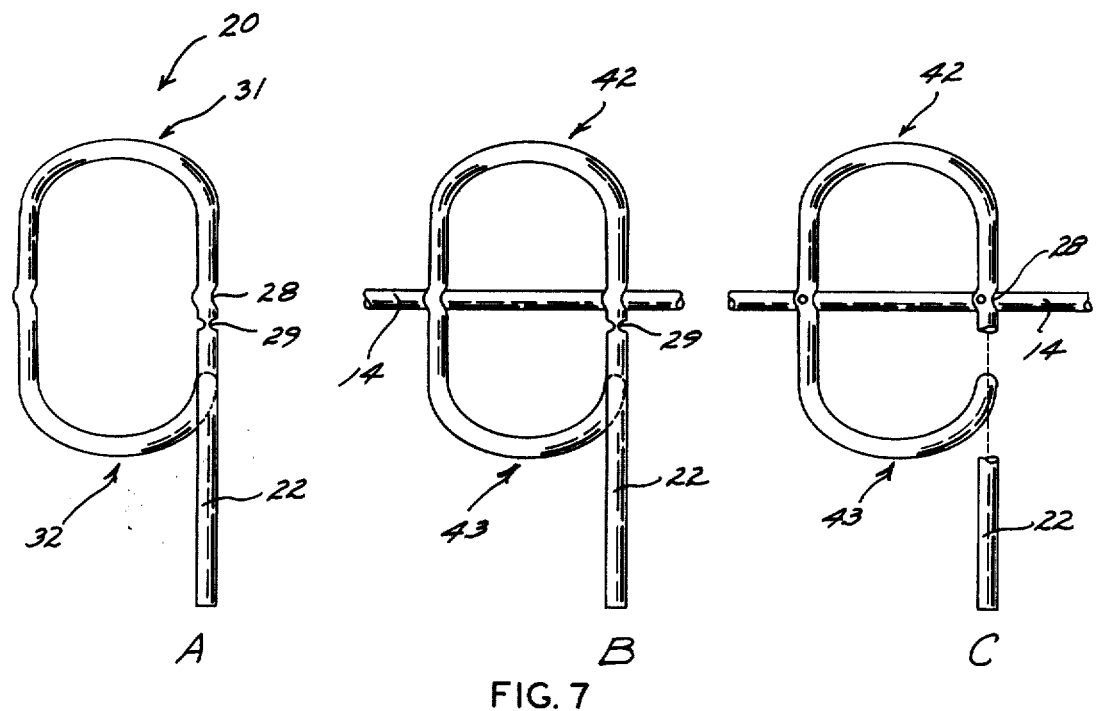
FIG. 7 is a series of front elevational views of the preferred embodiment depicting the form of the hook during the sequence of operations in installing it on an arch wire.

Referring to FIG. 7, the sequence of welding the hook device 20 or 40 to an orthodontic arch wire 14 is shown. FIG. 7-A shows the hook device 20 before welding; FIG. 7-B shows the hook device oriented on the arch wire 14 prior to welding; and FIG. 6-C shows the hook device 20 after it has been electrowelded at the indentations 28 and after the extension handle 22 has been sheared from the leg 23 by bending it back and forth or by cutting.

In the normal treatment program of a patient a coil spring 52 and an elastic band 53 (FIG. 1) are used to impart corrective forces to malpositioned teeth. The coil spring 52 is arranged in an intra-arch configuration, for intra-maxillary treatment, and is anchored at a terminal point (not shown) of the same arch. The front end 54 of the coil spring 52 is wrapped around the closed loop 31. One end of the elastic band 53 is shown looped over the open hook 32 and the other end thereof (not shown) is secured to another hook device 20. These elastic bands are changed numerous times per day by the patient.

There has been described an improved weldable orthodontic hook having a two point weld attachment to orthodontic arch wires. This hook has both a closed loop portion and an open loop portion for attachment of elastic bands and/or coil springs. The two point weld design provides ample weld strengths for normal orthodontic usage. This ability to be secured entirely by an electroweld process common to equipment now in usage in most orthodontic offices, eliminates the need for silver soldering of custom fabricated hooks, accompanied by undesirable heat softening of the stainless steel arch wires. The hook is designed for economical manufacture by known production techniques, and is conveniently supplied to the orthodontist in a preformed configuration for instant welding to selected points along the arch wires of various types of treatment plans. While the two embodiments described above include both an open and closed loop section to the hook, it is to be understood that the hook device can be supplied with the closed loop portion 31 only or the plate metal version can be supplied with a closed loop 42 only, an open hook 43 only or with two open hooks.

The size of the wire or plate used to fabricate the hook device is determined by the forces to be exerted on the hooks and is not necessarily determined by the diameter of the arch wire.

I claim:

1. An orthodontic hook device used as an attachment point for elastics, said hook device comprising:
   an arch wire; and
   a hook formed from wire and having a generally ovoid shape open at one end, said hook secured at two places proximate its midpoint to said arch wire, wherein that portion of said hook disposed above said arch wire forms a closed loop and that portion disposed below said arch wire forms an open loop.

2. An orthodontic hook device as defined in claim 1 and including a handle removably secured to said open loop, said handle provided to position said hook on said arch wire.

3. An orthodontic hook device as defined in claim 2 wherein said hook has a pair of parallel legs interconnected at their upper ends by an arcuate shaped link, a second arcuate shaped link is connected at one end to the other end of one of said legs and the other end thereof is disposed in juxtaposition with said other leg, each said leg secured to said arch wire intermediate said links thus forming said open and closed loops, and said handle secured to said other leg.

4. An orthodontic hook device as defined in claim 3 wherein each said leg has a bend formed therein to provide a seat for said arch wire at the point of securement.

5. An orthodontic hook device as defined in claim 4 wherein said handle is integral with said other leg and at the juncture of said leg and said handle a notch is formed to facilitate separation of said handle from said other leg.

6. An orthodontic hook device as defined in claim 3 and including a transverse base interconnected between said legs intermediate said links.

7. An orthodontic hook device as defined in claim 6 wherein said base has a longitudinal groove formed thereon in which said arch wire seats.

8. An orthodontic hook device as defined in claim 7 wherein said handle is integral with said other leg and at the juncture of said leg and said handle a notch is formed to facilitate separation of said handle from said other leg.

* * * * *